3,395,049
METHOD OF MAKING A POROUS ELECTRODE
Charles E. Thompson, Fanwood, N.J., assignor to Esso Research and Engineering Company, a corporation of Delaware
Continuation-in-part of application Ser. No. 295,221, July 15, 1963. This application Dec. 27, 1963, Ser. No. 334,022
13 Claims. (Cl. 136—122)

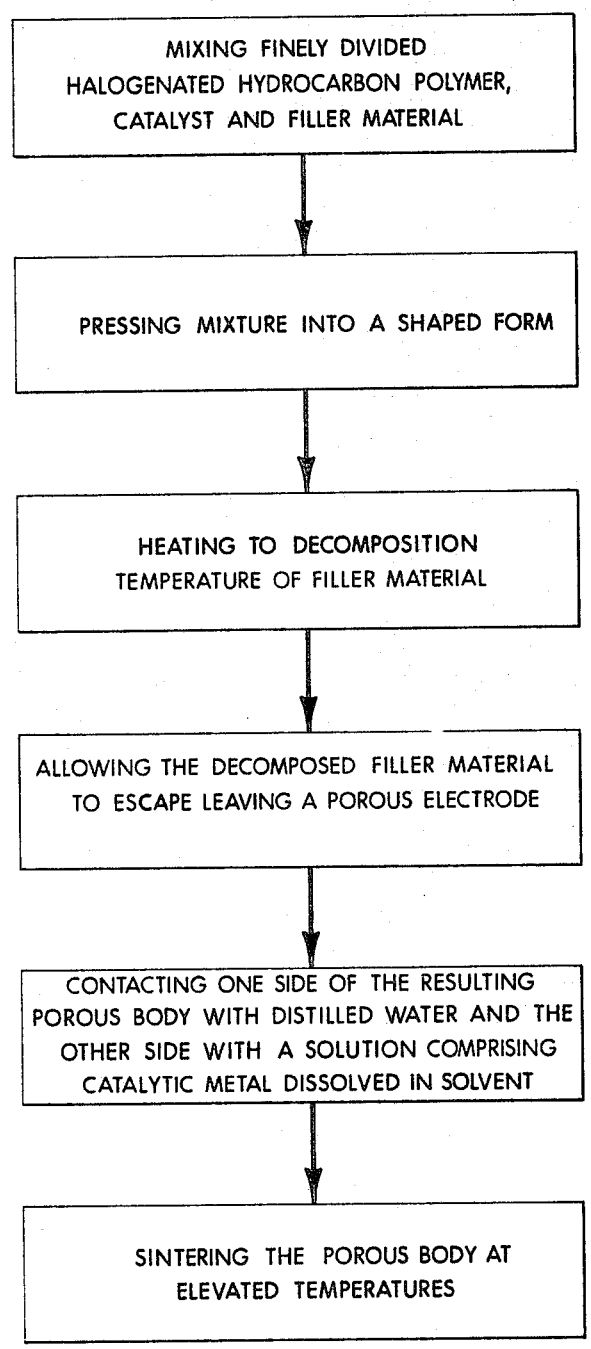

This application is a continuation-in-part of application Ser. No. 295,221, filed July 15, 1963 and now abandoned.

This invention relates to improvements in electrochemical cells and, in particular, to those cells designed for the production of electrical energy through the electrochemical oxidation of a fluid combustible fuel. More particularly, this invention relates to a method of making a porous electrode.

Heretofore, electrodes for use in electrochemical reactants and/or fuel cells have been electrodes such as porous carbon bodies, metal wire screens, metal coated membranes, sintered metal powders which have been pressed into shaped bodies and metal coated nonelectroconductive metal screens.

The sintered shaped metal bodies were usually made by taking one or more finely divided metal powders, mixing them with a binder so that the powders could be shaped and then heating the shaped body to high temperatures so as to vaporize the binder and fuse and sinter the metal particles. This required heating the shaped body to high temperatures of about 1900° F.

It has now been found that a highly efficient electrode can be made my mixing electrically conductive particles with a binder material and a filler material. The binder material will act so as to extend the catalyst and impart certain desirable properties to the electrodes such as rendering the electrode more or less hydrophobic, increasing the mechanical stability of the electrode and reducing the cost of the electrode. Reduction in cost is readily apparent when the electrode of this invention is compared to the electrode of the prior art which comprises a noble metal screen with a catalyst such as platinum black thereon. The filler material which is used in this invention will allow for the control of the porosity of the electrode. The electrodes prepared by this invention are extremely useful in systems wherein the fuel and/or oxidant would poison the opposing electrode. Heretofore in systems of this kind, membranes have been used to prevent the fuel from contacting the cathode and the oxidant from contacting the anode. It has now been found that by using an electrode prepared in accordance with the instant invention, it is not necessary to utilize a membrane in order to prevent the fuel from contacting the cathode. The electrode of this invention can be used to prevent the migration of the fuel by utilizing the electrode between a fuel compartment and the electrolyte compartment. The hydrophobic nature of electrodes prepared in accordance with the instant invention will prevent the aqueous electrolyte from flooding the pores of the electrode.

The binding material of this invention can be any high molecular weight material that is stable at the conditions at which the filler material is removed and under operating conditions of the electrolytic cell. Suitable materials are halogenated hydrocarbon polymers such as tetrafluoroethylene polymer, hexafluoropropylene polymer, fluoroethylene propylene polymer, chlorotrifluoroethylene polymer, polyvinylidene fluoride polymer, chlorinated ether polymers and aqueous suspensions or emulsions of the polymers.

The electrically conductive materials consist of finely divided carbon, charcoal, Group VIII metals, alloys and oxides of Group VIII metals, mixtures and alloys of Group VIII and Group VIIB metals and carbon or charcoal saturated with Group VIII metals, alloys or oxides of Group VIII and mixtures and alloys of Group VIII and Group VIIB metals. The following are examples of metals which can be used in the practice of this invention: Pt-Au, Pt-Re, Pt-Ir, Pt-Au-Fe, Pt with $Re_2O_7$, Au, Ag and Ni. The metals of this invention will function both as the electrically conductive element and as a catalyst. In the case of carbon, it is best to saturate the carbon with a catalyst such as Pt-Re, Pt-Ir or one of the other metals set forth above. The saturation of the finely divided carbon can be accomplished by the well-known procedures such as vacuum deposition, electrodeposition and saturation of the solution with the subsequent evaporation of the solvent.

The electrodes made by the instant process can be rendered more efficient by catalyzing the electrode after it has been pressed into the desired shape and rendered porous by heating. After the electrode has been shaped and rendered porous, the electrode is placed in a tank so that two different liquid solutions can be caused to contact each face of the electrode. The face of the electrode which will normally be in contact with the electrolyte when used in a fuel cell is covered with water or an electrolyte such as $H_2SO_4$, $H_3PO_4$, NaOH and KOH and the other side is exposed to a solution of the catalyst salt in which the solvent has a surface tension of not more than 30 dynes/cm. After adsorption of the catalyst salt, the salt is reduced to its active form by reduction with a reducing agent such as sodium borohydride, aryl silane, alkyl silane, formaldehyde or formic acid. The electrode is then washed and dried. This method of impregnating the electrode with catalyst is very efficient in that the catalyst is deposited at the region of electrode where it will be best utilized. This method of catalyst impregnation is very effective when the electrically conductive material used in the electrode is finely divided carbon.

The solvent for the catalyst salt is a liquid which has a surface tension of not more than 30 dynes/cm., preferably a surface tension of between 15 and 30 dynes/cm., and more preferably, a surface tension between 22 and 29 dynes/cm. Liquids which can be used as solvents for the catalyst salt include acetaldehyde, acetone, allyl alcohol, benzene, sec., normal and tertiary butyl alcohols, chloroform, ethyl alcohol, ethyl ether, isobutyl alcohol, isopropyl alcohol, methyl alcohol, octyl alcohol, propyl alcohol, propyl amine, toluene, trichloroethane and meta and paraxylene.

The filler material can be any particulate material that completely decomposes to gaseous products upon heating. The particulate filler material, of necessity, must either sublime or vaporize at a temperature at which the binder and electrically conductive materials are stable. Materials which are suitable for use as filler materials include polyethylene, polypropylene, ammonium oxalate and ammonium carbonate. The choice of particle size of the filler is determined by the size pores desired in that the size of the pore will be substantially the same size as the particle.

The method of this invention produces highly effective porous electrodes for use in a fuel cell or other electrochemical cell. The binder, electrically conductive material and filler are all mixed intimately and pressed into a rigid or semirigid structure. The pressed structure is then gradually heated to the decomposition (or vaporization) temperature of the filler. It is necessary that the pressed structure be heated from a temperature substantially below the temperature at which the filler will be removed and then gradually raised to this latter temperature. During this process of gradually increasing the temperature, the filler particles at the surface of the structure decompose first leaving cavities. Then the filler particles are decomposed sequentially from the surface inwardly to the center of the structure as the body heats from the surface to the center. The gaseous products escape from the interior of the structure through the cavities left by the particles that were closer to the surface. This process of gradually increasing the temperature to remove the filler material leaves a porous structure comprising essentially binder and catalyst for use as an electrode in an electrochemical cell. The efficiency of this electrode can be improved by heating the porous electrode to a temperature of about 710° F. This heat treating step increases the life of the electrode. This step can be performed after or as the pressed, shaped structure is heated to decompose the filler. After the filler is removed, the structure is heated to a temperature of between 700 and 725° F. under a nitrogen atmosphere for about 0.1 to 1.5 hours. Such electrode may be used either as the anode or cathode in such cell, an anode being an electrode whereat a fuel is oxidized and the cathode is an electrode whereat the oxidant is reduced. The accompanying drawing sets forth a flow sheet illustrating the process claimed.

The percent composition of each of the materials for the production of the electrodes is about 22 to 60 wt. percent electrically conductive material, about 10 to 35 wt. percent binder and about 15 to 55 wt. percent filler. The weight percent composition of electrically conductive material, binder and filler will be substantially 100% materials weight. The pressure at which the electrode is pressed can vary from about 3,000 to 20,000 p.s.i.g. Any pressure between the aforesaid limits is operable. Pressures below or above these limits result in inferior electrodes or electrodes that do not function properly.

This invention is more fully illustrated by the following examples which are illustrative only and should not be construed as limitations upon the true scope of the invention as set forth in the appended claims.

EXAMPLE 1

An electrode of this invention was prepared and tested as the anode in a fuel cell employing an organic fuel, 30 wt. percent sulfuric acid electrolyte and operated at 212° F. Two runs with this cell were made. In the first run, ethane was employed as a fuel and in the second run, ethylene was employed as the fuel. The electrode was prepared by intimately mixing 1 gram of tetrafluoroethylene polymer, 2 grams catalyst comprising pulverized carbon which had been impregnated with 6% Pt-Ir and 1 gram of ammonium oxalate as the filler. This mixture was intimately mixed in a ball mill. The mixture was then pressed at 15,000 p.s.i.g. to form a solid wafer. The wafer was then slowly heated to 380° F. in air for one hour during which time ammonium oxalate was vaporized and left the structure. Its porous structure was then used as the anode in the fuel cells described supra. The results of the experiment are set forth in Table I.

TABLE I

| Fuel | Polarization From Theory at Indicated amps/ft.$^2$ | | | | | |
|---|---|---|---|---|---|---|
| | 0 | 5 | 10 | 20 | 50 | 100 |
| Ethane | 0.12 | 0.25 | 0.32 | 0.45 | | |
| Ethylene | 0.12 | 0.25 | 0.31 | 0.38 | 0.49 | 0.60 |

EXAMPLE 2

The number of electrodes were prepared in accordance with this invention and tested as an electrode in a fuel cell. The electrodes were prepared in order to test various percentage compositions of the compounds. All the electrodes prepared functioned efficiently as electrodes in a fuel cell. The electrodes prepared had the following compositions:

(A) 50 wt. percent catalyst comprising 12.5% Pt-Au on carbon, 25 wt. percent tetrafluoroethylene as the binder, and 25 wt. percent ammonium oxalate as the filler.

(B) 50 wt. percent catalyst comprising 6% Pt-Ir on carbon, 25 wt. percent tetrafluoroethylene as the binder, and 25 wt. percent ammonium carbonate as the filler.

(C) 33 wt. percent catalyst comprising 6% Pt-Ir on carbon, 17 wt. percent tetrafluoroethylene as the binder, and 50 wt. percent ammonium oxalate as the filler.

(D) 25 wt. percent catalyst comprising platinum black, 25 wt. percent tetrafluoroethylene as the binder, and 50 wt. percent ammonium carbonate as the filler.

(E) 57.1 wt. percent platinum black as the catalyst, 14.3 wt. percent tetrafluoroethylene as the binder, and 28.6 wt. percent ammonium carbonate as the filler.

(F) 40 wt. percent catalyst comprising 6% Pt-Ir on carbon, 20 wt. percent tetrafluoroethylene as the binder, and 40 wt. percent ammonium carbonate as the filler.

Each of the electrodes A through F were pressed at pressures of from about 3500 p.s.i.g. to 10,000 p.s.i.g. and then heated gradually to the decomposition temperature of the filler material. In each of the cases there resulted a porous electrode comprising essentially catalyst and binder material.

EXAMPLE 3

An electrode prepared in accordance with this invention was tested as the cathode of a fuel cell. The electrode was prepared by intimately mixing 1 gram of finely divided tetrafluoroethylene polymer having substantially uniform particle diameters of about 35 microns, 2 grams catalyst comprising pulverized carbon which had been impregnated with 6% Pt-Ir and 1 gram of ammonium oxalate as the filler. This mixture was intimately mixed in a ball mill. The mixture was then pressed at 5000 p.s.i.g. to form a solid wafer. The wafer was then slowly heated to 380° F. in air and maintained at this temperature for about one hour during which time the ammonium oxalate was vaporized and left the structure. The resulting porous structure was then used as the cathode in a fuel cell with the following results:

TABLE II

| Oxidant | Polarization From Theory at Indicated amps/ft.$^2$ | | | |
|---|---|---|---|---|
| | 0 | 10 | 50 | 100 |
| Air | 0.23 | 0.27 | 0.37 | 0.45 |

EXAMPLE 4

An electrode was prepared in accordance with this invention and tested as an anode in a half cell employing an organic fuel, 85 wt. percent phosphoric acid electrolyte and operated at 302° F. Three runs were made with this cell. In the first run propane was employed as a fuel. In the second run ethane was employed as a fuel and in the third run isobutane was employed as a fuel. The electrode was prepared by intimately mixing 2 grams of finely divided tetrafluoroethylene polymer, 2 grams of platinum black and 4 grams of ammonium carbonate. The mixture was intimately mixed and pressed at a pressure of 7000 p.s.i.g. to form a solid wafer. The wafer was then gradually heated to 140° F. in air for one hour during which time the ammonium carbonate was vaporized and left the structure. The porous structure was then used in the anode in the fuel cells described supra. The results of the experiment are set forth in Table III.

TABLE III

| Fuel | Polarization From Theory at Indicated amps/ft.$^2$ | | | |
|---|---|---|---|---|
| | 0 | 10 | 20 | 50 |
| Propane | 0.00 | 0.21 | 0.26 | 0.40 |
| Ethane | 0.05 | 0.26 | 0.31 | 0.46 |
| Isobutane | 0.05 | 0.30 | 0.38 | |

EXAMPLE 5

An electrode was prepared and tested as the anode in a fuel cell employing 30 wt. percent sulfuric acid as the electrolyte and ethane as the fuel. The temperature of the cell was maintained at about 212° F. and air was used as the primary oxidant. The electrode was prepared by intimately mixing 4 grams of finely divided carbon which had been impregnated with a 6% Pt-Ir catalyst, 2 grams of tetrafluoroethylene polymer and 2 grams of ammonium oxalate. The mixture was ball milled for 20 minutes and then pressed at 10,000 p.s.i.g. The electrode was then heated under a nitrogen atmosphere by slowly bringing the temperature up to 710° F. for about 2 hours. The resulting electrode was tested and found to be stable upon repeated runs as the anode in a fuel cell. The polarization of the electrode remained at 0.56 volt at 20 milliamps/cm.² during successive runs. This is surprising since normally electrodes increase in polarization upon successive runs.

EXAMPLE 6

An electrode was prepared by intimately mixing 4 grams of finely divided carbon which was saturated with 6% Pt-Ir, 2 grams of tetrafluoroethylene and 2 grams of ammonium oxalate. The mixture was pressed at 10,000 p.s.i.g. and then gradually heated in air up to 380° F. This temperature brought about the decomposition of ammonium oxalate thereby leaving the pressed electrode porous. The electrode was then placed in a nitrogen atmosphere and heated to 715° F. for about 2 hours. The electrode was tested as the anode in a fuel cell utilizing ethane as the fuel, 30 wt. percent sulfuric acid as the electrolyte and air as the oxidant. The cell was operated at about 212° F. The tests indicated the electrode to be stable, i.e., that is, substantially constant polarization, over successive runs.

EXAMPLE 7

An electrode which was prepared in accordance with the procedure set forth in Example 1 was placed in a container so that the electrode divided the container into two parts. The side of the electrode that would normally contact the electrolyte when used in the cell was covered with distilled water. The other side of the electrode was covered with a solution comprising a 5% solution of chloroplatinic acid in ethyl alcohol. The electrode was allowed to remain in contact with the solutions for about 16 hours then removed and dried at about 220° F. The dried electrode was then immersed in a 1% aqueous solution of NaBH₄ for 30 minutes. The electrode was then removed and tested as the anode in a fuel cell employing ethane as the fuel, 30 wt. percent sulfuric acid as the electrolyte and operated at about 212° F. This method increased the power output of a cell over that of the electrode prepared in Example 1. The polarization at 20 milliamps/ft.² for the electrode of this example was 0.27 volt whereas for the electrode of Example 1, it was 0.45 volt. Subsequent controlled saturation increases the efficiency of the electrodes.

EXAMPLE 8

An electrode was made wherein the tetrafluoroethylene was used in the form of an aqueous suspension rather than as a dried powder. This electrode was prepared by mixing 10 grams of catalyzed carbon which was saturated with a 6% Pt-Ir catalyst with 100 milliliters of water and 0.5 milliliter of

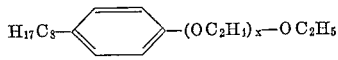

where $x$ is 8 or 9 (a commercial wetting agent known as Triton X-100 manufactured by Rohm & Haas Company) and 5.3 cc.'s of a 33 wt. percent tetrafluoroethylene polymer aqueous suspension. This mixture was then filtered and air dried for 2 hours. The material was then divided into 2 parts and 2 electrodes were made.

(A) The electrode was made by drying the air dried mixture at 230° F., ball milling the mixture with 3 grams of ammonium oxalate for 20 minutes and pressing the mixture into a desired shape at 10,000 p.s.i.g. The pressed electrode was then heated under nitrogen at 720° F. for 1 hour. The electrode was then tested as the anode in a fuel cell utilizing hydrogen as the fuel. At 500 milliamps/cm.², polarization of the electrode was only 0.11 volt.

(B) The second electrode was made by ball milling the air dried paste with 3 grams of ammonium oxalate for 20 minutes and then pressing into shape at 10,000 p.s.i.g. The electrode was then heater under a nitrogen atmosphere at 720° F. for 65 minutes. The electrode was then tested and found to be substantially the same as the first electrode made by (A) supra.

EXAMPLE 9

An electrode was made by mixing 10 grams of Pt-Re catalyzed carbon with 100 milliliters of water and 0.5 milliliter of a surface-active agent such as

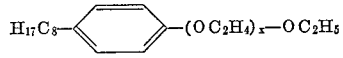

where $x$ is 8 or 9 (a commercial wetting agent known as Triton X-100 manufactured by Rohm & Haas Company) and 5.3 milliliters of a tetrafluoroethylene suspension having 33 wt. percent tetrafluoroethylene therein. The mixture was filtered and air dried for about 2 hours and then ball milled with 6 grams of ammonium oxalate for about 20 minutes. The mixture was then pressed into shape at 8,578 p.s.i.g. The pressed structure was then slowly heated to 390° F. for 20 minutes. This caused the ammonium oxalate to slowly decompose leaving a porous structure. The electrode was tested in a fuel cell employing hydrogen as the fuel and found to be very efficient.

EXAMPLE 10

In order to afford easier handling of electrodes, two electrodes were made by mixing 2 grams of powdered tetrafluoroethylene polymer, 4 grams pulverized carbon which had been impregnated with 6 wt. percent Pt-Re and 2 grams of ammonium oxalate as the filler. The mixture was then intimately mixed in a ball mill. The mixture was then divided into 2 portions and the two electrodes were made as follows:

(a) The first portion was spread onto a tantalum screen and pressed at 9,000 p.s.i.g. to form a solid wafer. The wafer was then slowly heated to 380° F. in air to decompose the ammonium oxalate. This formed a porous electrode denoted A.

(b) The second portion was spread onto a fiber glass screen and then pressed at 10,000 p.s.i.g. to form a wafer. The wafer was then slowly heated to 380° F. to decompose the filler. A porous body was thereby formed denoted electrode B.

The two electrodes A and B were then tested to check their stability during handling. These electrodes with the incorporated screens were found to require less care in that they were not as fragile as the electrodes without the screens. The efficiency of the electrodes was not impaired by the presence of the screens.

What is claimed is:

1. A method of making a porous electrode which comprises:
   (a) intimately mixing finely divided halogenated hydrocarbon polymer, finely divided electrically conductive particles selected from the group consisting of carbon, charcoal, Group VIII metals, alloys of Group VIII metals, oxides of Group VIII metals, Group VII (B) metals, alloys of Group VIII metals and Group VII (B) metals, and mixtures of the above and particulate filler material;
   (b) pressing the mixture into a shaped form;
   (c) slowly heating the shaped form to a temperature at which said filler material becomes a gas, said temperature being substantially lower than the sintering temperature of the halogenated hydrocarbon polymer;
   (d) allowing the gas formed by step (c) to escape leaving a porous electrode;

(e) contacting the side of the porous electrode that will normally be in contact with the electrolyte when used in a fuel cell with a compound selected from the group consisting of water, sulfuric acid, phosphoric acid, aqueous sodium hydroxide, and aqueous potassium hydroxide and contacting the other side of the electrode with a solution of a salt of a catalytic metal, said metal being selected from the group consisting of Group VIII metals, Group VII (B) metals and mixtures of Group VIII and Group VII (B) metals in a solvent which has a surface tension of between about 15 to 30 dynes/cm. and then;

(f) contacting the electrode with an aqueous solution of a reducing agent selected from the group consisting of sodium borohydride, aryl silane, alkyl silane, formaldehyde and formic acid.

2. A method as claimed in claim 1 which comprises the additional step of sintering the porous electrode.

3. A method as claimed in claim 1 wherein said solvent is ethyl alcohol.

4. A method as claimed in claim 1 wherein the electrode is sintered prior to step (e).

5. A method as claimed in claim 1 wherein the halogenated hydrocarbon polymer is tetrafluoroethylene polymer, the electrically conductive particles are carbon particles and the particulate filler material is ammonium oxalate.

6. A method as claimed in claim 5 wherein the finely divided carbon is impregnated with a platinum-rhenium catalyst prior to mixing.

7. A method as claimed in claim 5 wherein the catalytic metal salt is a mixture of chloroplatinic acid and rhenium heptoxide.

8. A method as claimed in claim 5 wherein the solvent is ethyl alcohol.

9. A method of making a porous electrode which comprises:
(a) intimately mixing finely divided electrically conductive particles selected from the group consisting of carbon, charcoal, Group VIII metals, alloys of Group VIII metals, oxides of Group VIII metals, Group VII (B) metals, alloys of Group VIII metals and Group VII (B) metals, and mixtures of the above, particulate filler material, and an aqueous suspension of finely divided halogenated hydrocarbon polymer in water containing a wetting agent;
(b) filtering the mixture,
(c) drying the mixture,
(d) pressing the mixture into a shaped form,
(e) slowly heating the shaped form to a temperature at which said filler material becomes a gas, said temperature being substantially lower than the sintering temperature of the halogenated hydrocarbon polymer; and
(f) allowing the gas formed by step (e) to escape leaving a porous electrode.

10. A method of making a porous electrode as claimed in claim 9 which comprises the additional step of sintering the porous electrode.

11. A method as claimed in claim 9 wherein the halogenated hydrocarbon polymer is tetrafluoroethylene polymer, the electrically conductive particles are carbon particles and the particulate filler material is ammonium oxalate.

12. A method as claimed in claim 9 wherein the electrically conductive particles are catalyzed carbon particles and the wetting agent is

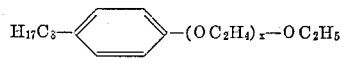

wherein $x$ is selected from the group consisting of the numbers 8 and 9.

13. A method of making a porous electrode as claimed in claim 12 which comprises the additional step of sintering the porous electrode.

References Cited

UNITED STATES PATENTS

| | | | |
|---|---|---|---|
| 2,089,569 | 8/1937 | Orthner et al. | |
| 2,252,277 | 8/1941 | Tate et al. | |
| 2,782,180 | 2/1957 | Weidman | 264—127 X |
| 2,985,918 | 5/1961 | Moore et al. | 264—127 X |
| 3,058,166 | 10/1962 | Fields | 264—54 |
| 3,183,123 | 5/1965 | Harworth | 136—120 X |
| 3,212,930 | 10/1965 | Thompson et al. | 136—120 X |
| 3,239,382 | 3/1966 | Thompson | 136—86 |
| 3,248,267 | 4/1966 | Langen et al. | 136—120 |
| 2,440,190 | 4/1948 | Alfthan | 264—127 |
| 2,520,173 | 8/1950 | Sanders | 264—127 X |
| 2,578,522 | 12/1951 | Edgar | 264—127 |
| 2,938,234 | 5/1960 | Slade | 264—85 |
| 3,118,846 | 1/1964 | Boyer | 264—127 |
| 3,309,231 | 3/1967 | Hess | 136—122 |

FOREIGN PATENTS

| | | |
|---|---|---|
| 232,629 | 3/1959 | Australia. |
| 946,308 | 12/1961 | Great Britain. |

JAMES A. SEIDLECK, *Primary Examiner.*

P. E. ANDERSON, *Assistant Examiner.*